United States Patent [19]

Kaneko et al.

[11] Patent Number: 5,704,964
[45] Date of Patent: Jan. 6, 1998

[54] PRESSURE SWING ADSORPTION PROCESS

[75] Inventors: Teruji Kaneko; Kenji Ikeda; Masato Kawai; Kazuto Usogoe; Shin Hayashi; Kenji Kudo, all of Kawasaki, Japan

[73] Assignee: Nippon Sanso Corporation, Tokyo, Japan

[21] Appl. No.: 578,224

[22] Filed: Dec. 26, 1995

[30] Foreign Application Priority Data

Dec. 27, 1994 [JP] Japan .................... 6-326389
Dec. 27, 1994 [JP] Japan .................... 6-326440
Dec. 27, 1994 [JP] Japan .................... 6-326453

[51] Int. Cl.$^6$ .................... B01D 53/047
[52] U.S. Cl. .................... 95/23; 95/101; 95/102; 95/105; 95/130
[58] Field of Search .................... 95/8, 11, 12, 19–23, 95/96–105, 130, 138

[56] References Cited

U.S. PATENT DOCUMENTS

| | | | |
|---|---|---|---|
| 3,564,816 | 2/1971 | Batta | 95/100 |
| 3,636,679 | 1/1972 | Batta | 95/100 |
| 3,703,068 | 11/1972 | Wagner | 95/11 |
| 3,717,974 | 2/1973 | Batta | 95/98 |
| 3,738,087 | 6/1973 | McCombs | 95/98 |
| 3,923,477 | 12/1975 | Armond et al. | 95/103 |
| 4,140,495 | 2/1979 | Pietruszewski | 95/23 |
| 4,197,095 | 4/1980 | White, Jr. et al. | 95/23 X |
| 4,299,595 | 11/1981 | Benkmann et al. | 95/19 X |
| 4,348,213 | 9/1982 | Armond | 95/103 |
| 4,472,177 | 9/1984 | Sircar | 95/11 |
| 4,552,571 | 11/1985 | Dechene | 95/22 |
| 4,576,614 | 3/1986 | Armond et al. | 95/96 X |
| 4,648,888 | 3/1987 | Rowland | 95/8 |
| 4,693,730 | 9/1987 | Miller et al. | 95/8 |
| 4,810,265 | 3/1989 | Lagree et al. | 95/101 |
| 5,071,453 | 12/1991 | Hradek et al. | 95/8 X |
| 5,158,625 | 10/1992 | Lhote et al. | 95/104 X |
| 5,176,722 | 1/1993 | Lemcoff et al. | 95/102 |
| 5,258,056 | 11/1993 | Shirley et al. | 95/22 |
| 5,407,465 | 4/1995 | Schaub et al. | 95/101 X |
| 5,520,720 | 5/1996 | Lemcoff | 95/103 X |
| 5,529,607 | 6/1996 | Tan | 95/12 |
| 5,536,299 | 7/1996 | Girard et al. | 95/101 |
| 5,540,758 | 7/1996 | Agrawal et al. | 95/101 |

FOREIGN PATENT DOCUMENTS 57-071804  5/1982  Japan .................... 95/12

*Primary Examiner*—Robert Spitzer
*Attorney, Agent, or Firm*—Armstrong, Westerman, Hattori, McLeland & Naughton

[57] ABSTRACT

A pressure swing adsorption process which includes switching a plurality of adsorption columns packed with an adsorbent successively to an adsorption step, a pressure equalization step, an evacuation step, a vacuum purge step, a pressure equalization step and a repressurization step to allow a more strongly adsorbable component gas contained in a gaseous mixture to be adsorbed on the adsorbent and to separate a less strongly adsorbable component gas. The process further includes compressing the thus separated less strongly adsorbable component gas by a product gas compressor to supply it as a product gas. An adsorption column having completed the adsorption step and another adsorption column having completed the vacuum purge step are allowed to communicate to each other on product discharge sides and on raw material supply sides respectively in the pressure equalization step, to recover the product gas under gradual increase of gas flow rate on the raw material supply side and also to evacuate the adsorption column having completed the adsoroption step.

14 Claims, 9 Drawing Sheets

FIG.2

| STEP | COLUMN A | COLUMN B | COLUMN C |
|---|---|---|---|
| 1 | ADSORPTION | PRESSURE EQUALIZATION | PRESSURE EQUALIZATION |
| 2 | ADSORPTION | EVACUATION | PRODUCT REPRESSURIZATION |
| 3 | ADSORPTION | VACUUM PURGE | PRODUCT REPRESSURIZATION |
| 4 | PRESSURE EQUALIZATION | PRESSURE EQUALIZATION | ADSORPTION |
| 5 | EVACUATION | PRODUCT REPRESSURIZATION | ADSORPTION |
| 6 | VACUUM PURGE | PRODUCT REPRESSURIZATION | ADSORPTION |
| 7 | PRESSURE EQUALIZATION | ADSORPTION | PRESSURE EQUALIZATION |
| 8 | PRODUCT REPRESSURIZATION | ADSORPTION | EVACUATION |
| 9 | PRODUCT REPRESSURIZATION | ADSORPTION | VACUUM PURGE |

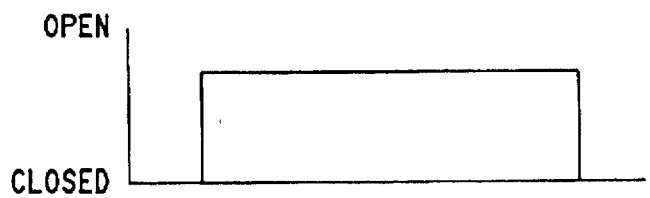
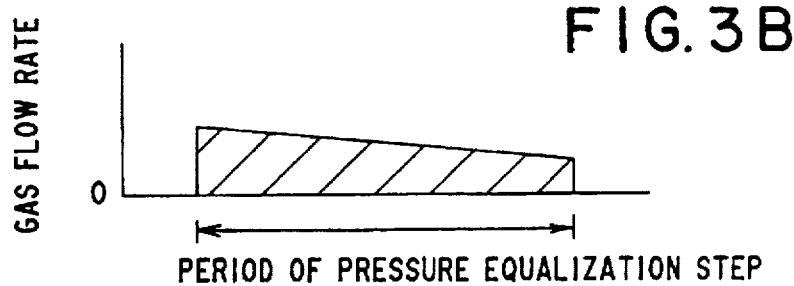
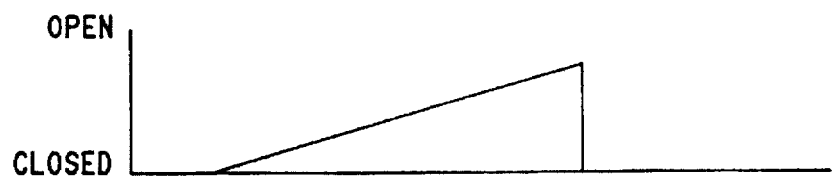
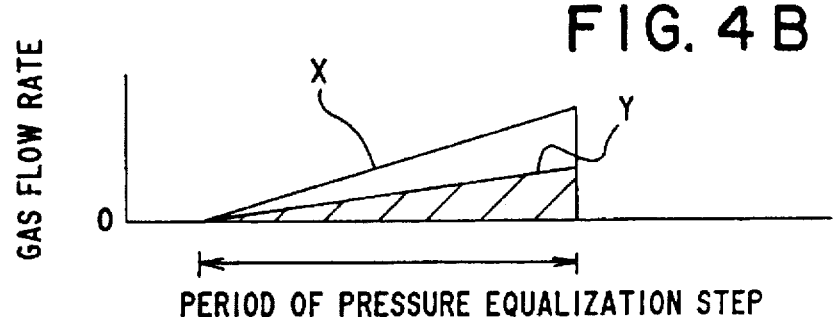

FIG. 6A
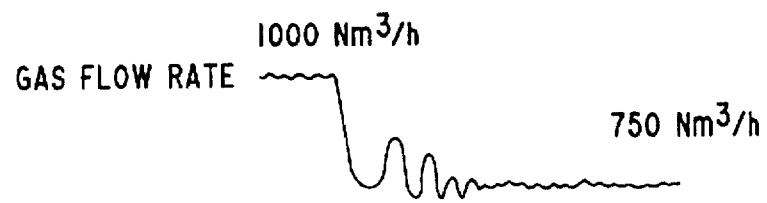
FIG. 6B
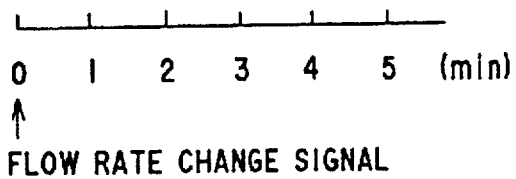
↑
FLOW RATE CHANGE SIGNAL
FIG. 7
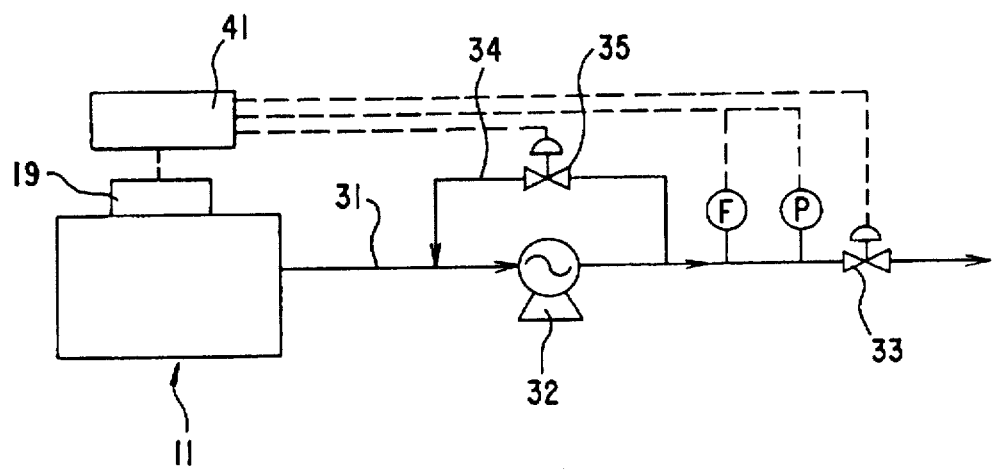

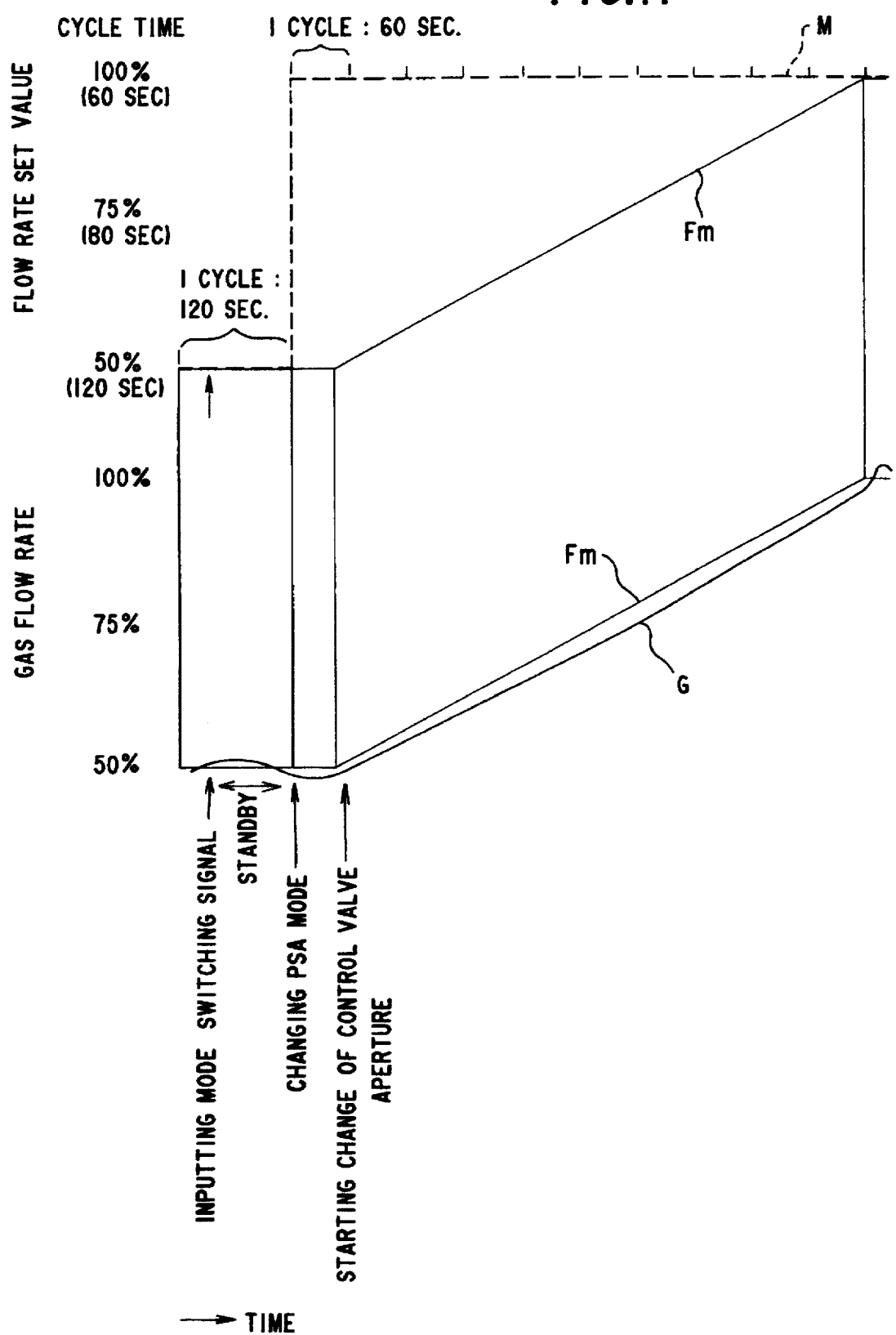

PRESSURE SWING ADSORPTION PROCESS

BACKGROUND OF THE INVENTION AND RELATED ART STATEMENT

The present invention relates generally to a pressure swing adsorption process, more particularly to a pressure swing adsorption process employing air as a raw gas and a plurality of adsorption columns packed with an adsorbent which adsorbs preferentially nitrogen gas to separate less strongly adsorbable gaseous component oxygen gas as a final product.

The method of separating oxygen from nitrogen contained in air by the pressure swing adsorption process (hereinafter referred to as PSA process) to give oxygen as a final product has been conventionally practiced widely using zeolite as an adsorbent. In an oxygen producing apparatus resorting to the PSA process (oxygen PSA), basically, a plurality of adsorption columns packed with zeolite as described above are designed to be subjected alternately to an adsorption step which is operated under a relatively high pressure and to a regeneration step which is operated under relatively low pressure to continuously produce an oxygen product. However, a pressure equalization step and a repressurization step are interposed between these two steps recently so as to reduce the cost of product oxygen. It is also practiced to employ a so-called cocurrent depressurization step instead of the pressure equalization step and to utilize the concentrated oxygen content remaining in the adsorption columns having completed the adsorption step as a final product or a purge gas.

In any case, in order to downsize the apparatus or reduce the cost of the product oxygen, it is important to increase the amount of oxygen generated per amount of adsorbent (productivity of adsorbent) and recovery ratio of the product oxygen se as to reduce the unit power consumption.

For example, as a means for increasing the amount of oxygen generated For amount of adsorbent, it is effective to carry out purging in the columns with a part of the product gas in the purging step to promote desorption of nitrogen from the adsorbent (zeolite). The operation of purging with the product oxygen is widely employed irrespective of the depressurization method in the purging step (vacuum purge where the gas in the adsorption column is evacuated by a vacuum means to provide a reduced pressure or atmospheric purging where the gas in the adsorption column is released without using a vacuum means to provide a reduced pressure).

Meanwhile, by carrying out the pressure equalization step the gas in the adsorption column containing concentrated oxygen and having completed the adsorption step can be recovered into the column having completed the regeneration step, so that oxygen recovery ratio can be increased. However, the conventional pressure equalization method suffers an inconvenience that the effective nitrogen adsorption capacity of the adsorbent is lowered, since inclusion of nitrogen content unavoidably accompanies with the recovery of the oxygen content.

That is, to carry out the purging operation said above is mainly to improve the amount of oxygen generated per amount of adsorbent, and recovery ratio is not so much changed. Although recovery ratio of the product oxygen can be improved by performing the pressure equalization step, the amount of oxygen generated per amount of adsorbent is lowered. Since it is an antinomic demand to increase both recovery ratio of the product oxygen and the amount of oxygen generated per amount of adsorbent, as described above, there has been no practicable process which can satisfy these two requirements.

Meanwhile, with respect to the oxygen PSA which is employed on the industrial scale, a large amount of electric power is consumed proportional to the amount of oxygen generated, so that if the amount of oxygen, to be consumed on the spot is reduced, the operational state of the oxygen PSA is changed to a turn down mode so as to reduce the amount of oxygen to be generated and to save power consumption.

In other words, in a PSA apparatus such as the oxygen PSA, the operational mode of the apparatus is changed depending on the amount of product gas consumed so as to adjust the amount of product gas to be generated. However, according to the prior art method, the operational mode is changed under monitoring of the amount of product gas generated from the apparatus, flow characteristics of the gas such as purity, flow rate and pressure to adjust the feed amount of product gas.

However, in a recent large-scale oxygen PSA, a so-called VSA process, which involves atmospheric adsorption and evacuation, is employed, sc that the product oxygen at the outlet of the adsorption column assumes substantially atmospheric pressure, and it is necessary to provide a compressor on the route of feeding the product gas so as to allow the product oxygen taken out from the adsorption column to be supplied under a pressure desired on the spot.

Accordingly, in order to change the feed amount of product gas in the PSA apparatus equipped with such compressor for delivering the product gas, it is essential to construct an operational system in which a means for changing flow rate of the product gas generated from the PSA apparatus is integrated with a means for changing the delivery of the product gas compressor.

OBJECT AND SUMMARY OF THE INVENTION

It is a first objective of the present invention to provide a PSA process which can increase recovery ratio of the product gas as a less strongly adsorbable component and which can also increase the amount of product gas generated per amount of adsorbent.

It is a second objective of the present invention to provide a PSA process which can easily and smoothly change the amount of product gas in adjusting the amount of gas to be produced depending on the consumption of the gas on the spot when product gas is used.

A first aspect of the present invention is to provide a pressure swing adsorption process which comprises switching a plurality of adsorption columns packed with an adsorbent successively to an adsorption step, a pressure equalization step, an evacuation step, a vacuum purge step, a pressure equalization step and a repressurization step to allow a more strongly adsorbable component gas contained in a gaseous mixture to be adsorbed on the adsorbent and to separate a less strongly adsorbable component gas; and compressing the thus separated less strongly adsorbable component gas by a product gas compressor to supply it as a product gas; wherein an adsorption column having completed the adsorption step and another adsorption column having completed the vacuum purge step are allowed to communicate to each other on the product discharge sides and on the raw material supply sides respectively in the pressure equalization step, to recover the product gas under gradual increase of gas flew rate on the raw material supply side and at the same time to evacuate the adsorption column having completed the adsorption step.

In the pressure equalization step, the flow rate of the gas is controlled and a flow control means and/or a valve operating speed control means is disposed on gas recovery lines connecting the product discharge sides and the raw gas supply sides of the adsorption columns respectively to control the gas flow rate.

Accordingly, the abruptly flowing gas is prevented from the gas-releasing side adsorption column to the gas-receiving side adsorption column. Besides, it does not happen that the undesired easily adsorptive component flows into the gas-receiving side column, so that recovery ratio of the product and the amount of product gas generated per amount of adsorbent can be increased.

A second aspect of the present invention is to provide a pressure swing adsorption process which comprises switching a plurality of adsorption columns packed with an adsorbent successively to an adsorption step, a pressure equalization step, an evacuation step, a vacuum purge step, a pressure equalization step and a repressurization step to allow a more strongly adsorbable component gas contained in a gaseous mixture to be adsorbed on the adsorbent and to separate a less strongly adsorbable component gas; and compressing the thus separated less strongly adsorbable component gas by a product gas compressor to supply it as a product gas; wherein procedures of changing the feed amount of product gas is carried out by inputting a signal for changing the feed amount of product gas (a) to control the aperture of a circulatory flow control valve disposed on a circulatory route connecting the discharge side and inlet side of the product gas to control the amount of gas circulating from the discharge side to the inlet side of the compressor, whereby to control the amount of product gas delivered from the product gas compressor to the product gas feed route to a preset flow rate after the change; and (b) to control the aperture of a control valve disposed on the product gas feed route to a level corresponding to predetermined gas flow conditions.

Thus, since the aperture of the circulatory flow rate control valve of the product gas compressor is adjusted and also the aperture of the control valve provided on the product gas feeding route is controlled depending on the gas flow conditions, the amount of product gas to be generated can be easily and smoothly changed depending on the consumption of the gas on the spot. Meanwhile, the PSA apparatus can be automated by controlling the aperture of the circulatory flew control valve and the aperture of the control valve on the product gas feeding route based on a signal output from one controller.

A third aspect of the present invention is to provide a pressure swing adsorption process which comprises switching a plurality of adsorption columns packed with an adsorbent successively to an adsorption step, a pressure equalization step, an evacuation step, a vacuum purge step, a pressure equalization step and a repressurization step to allow a more strongly adsorbable component gas contained in a gaseous mixture to be adsorbed on the adsorbent and to separate a less strongly adsorbable component gas; and compressing the thus separated less strongly adsorbable component gas by a product gas compressor to supply it as a product gas; wherein procedures of reducing the feed amount of product gas is carried out by inputting a signal for reducing the amount of product gas to control the aperture of a flow control valve disposed on a product gas feed route to a level corresponding to the reduced feed amount of product gas, and upon the feed amount of product gas substantially reaching the present level, each step switching timing is changed in accordance with an operational mode corresponding to the reduced feed amount of product gas.

A fourth aspect of the present invention is to provide a pressure swing adsorption process which comprises switching a plurality of adsorption columns packed with an adsorbent successively to an adsorption step, a pressure equalization step, an evacuation step, a vacuum purge step, a pressure equalization step and a repressurization step to allow a more strongly adsorbable component gas contained in a gaseous mixture to be adsorbed on the adsorbent and to separate a less strongly adsorbable component gas; and compressing the thus separated less strongly adsorbable component gas by a product gas compressor to supply it as a product gas; wherein procedures of increasing the feed amount of product gas is carried out by inputting a signal for increasing the amount of product gas to change each step switching timing in accordance with an operational mode corresponding to the increased feed amount of product gas and then to control the aperture of a flow control valve disposed on a product gas feed route to a level corresponding to the increased feed amount of product gas.

Accordingly, the operational state of the apparatus can be switched to a turn down mode or an incremental operational mode while the product gas is maintained at a predetermined purity level, and also the flow rate of the product gas can be changed easily and smoothly depending on the consumption on the spot.

Meanwhile, in the PSA process according to the second, third or fourth aspect, the adsorption column having completed the adsorption step and the adsorption column having completed the vacuum purge step are allowed to communicate to each other on the product discharge sides and the feed gas supply side, in the pressure equalization step, so as to recover the gas contained in the adsorption column having completed the adsorption step into the adsorption column having completed the vacuum purge step and at the same time to evacuate the adsorption column having completed the adsorption step.

Further, in the PSA process according to the second, third or fourth aspect, the flow rate of recovery gas on the raw material supply side is increased gradually in the pressure equalization step. In this pressure equalization step, the gas flow rate is controlled and a flow control means and/or a valve operating speed control means is disposed on the gas recovery lines connecting the product discharge sides and the raw gas supply sides respectively to control the gas flow rate.

Meanwhile, in each PSA process described above, the amount of recovery gas on the product discharge side in the pressure equalization step is in the range of ½ to ¾ of the total amount of recovery gas, and the amount of recovery gas on the raw material supply side is in the range of ¼ to ½ of the total amount of recovery gas.

BRIEF DESCRIPTION OF THE DRAWINGS

The features of the present invention that are believed to be novel are set forth with particularity in the appended claims. The invention, together with the objects and advantages thereof, may best be understood by reference to the following description of the presently preferred embodiments taken in conjunction with the accompanying drawings in which:

FIG. 2 is a process cycle chart showing an example for embodying the process of the present invention employing the apparatus shown in FIG. 1;

FIG. 3 is a chart showing relationship between gas flow rate, valve aperture and gas flow rate, in a product discharge side pressure equalization operation in the apparatus shown in FIG. 1;

FIG. 4 is a chart showing relationship between valve aperture and gas flow rate in a feed gas supply side pressure equalization operation in the apparatus shown in FIG. 1;

FIG. 6 is a chart showing how the flow rate and pressure of the product gas change in the apparatus shown in FIG. 1;

FIG. 7 is a system chart showing an example of pressure swing adsorption apparatus for practicing another embodiment of the present process;

FIG. 11 is a chart showing relationship, in the apparatus shown in FIG. 7, among the operational mode of the PSA apparatus, flow rate set value of the flow control valve and actual flow rate of product oxygen, when the operational mode is switched to another incremental operational mode;

DETAILED DESCRIPTION OF PREFERRED EMBODIMENTS

The process of the present invention will be described below in more detail referring to the attached drawings.

Figure 1:
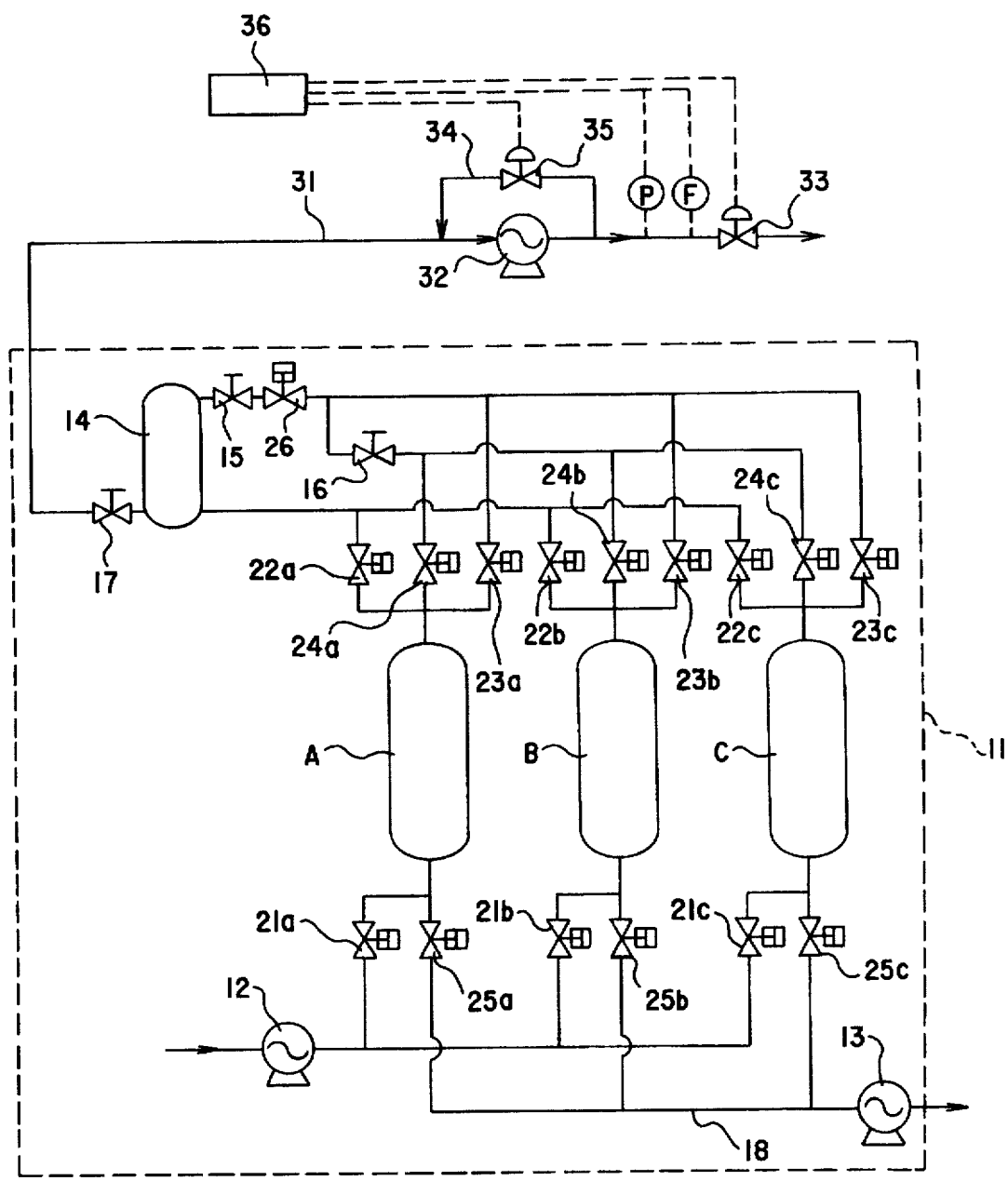
FIG. 1 is a flow diagram showing an example of pressure swing adsorption apparatus for practicing an embodiment of the present invention.

FIG. 1 shows an example of pressure swing adsorption apparatus for practicing one embodiment of the present invention, which is an oxygen PSA for separating oxygen from nitrogen contained in air employed as a raw material to collect oxygen as a final product.

To describe first constitution of the PSA apparatus 11, it is of three-column type PSA apparatus having three adsorption columns A,B,C packed with zeolite as an adsorbent which preferentially adsorbs nitrogen. This PSA apparatus is provided with a low-pressure blower 12 which increases the pressure of the raw material air to a predetermined level and feeds it to the adsorption columns, a vacuum pump 13 for evacuating the adsorption columns, a product storage tank 14 for temporarily storing the product oxygen led out of the adsorption columns, flow control valves 15,16 for controlling gas flow rate in the regeneration step or in the pressurization step, a product oxygen gas feed main valve 17 located at the outlet of the product storage tank 14 and a plurality of automatic valves 21,22,23,24,25,26 for switching the operational mode of the adsorption columns to the adsorption step, purging step, etc., respectively, (reference numbers of these valves attached to the respective adsorption columns A, B and C are affixed with a, b and c, correspondingly).

Among these automatic valves, those with reference numbers 21a,21b,21c are air inlet valves for the respective adsorption columns A,B,C; those with reference numbers 22a,22b,22c are product outlet valves for the respective adsorption columns A,B,C; those with reference numbers 23a,23b,23c are repressurization valves for the respective adsorption columns A,B,C; those with reference numbers 24a,24b,24c are pressure equalizer valves for the respective adsorption columns A,B,C; those with reference numbers 25a,25b,25c are evacuation valves for the respective adsorption columns A,B,C; and one with a reference number 26 is a main repressurization valve.

The vacuum pump 13 is connected to the respective adsorption columns A,B,C, by a discharge pipe 18 on which the evacuation valves 25a,25b,25c are located. As these evacuation valves 25a,25b,25c, those which can control their valve opening speed, for example, equipped with speed controllers (operational speed controller) are employed.

The reference number 31 denotes a product gas feed piping connected to the product oxygen gas feed main valve 17 of the PSA apparatus. The product gas feed piping 31 is provided with a product gas compressor 32; a control valve 33 locating downstream the product gas compressor 32; a circulatory flow control valve 35 of a circulatory passage 34 connecting to the discharge side and inlet side of the product gas compressor 32; and a flow meter F and a pressure gauge P located between the discharge side joint of the product gas compressor 32 on the circulatory passage 34 and the flow control valve 33.

The reference number 36 denotes a controller, which controls the aperture of the circulatory flow control valve 35 by an input signal for changing the feed amount of product gas and also controls the aperture of the control valve 33 based on the flow rate and pressure values of the product gas measured by the flow meter F and the pressure gauge P.

In the oxygen PSA apparatus 11, oxygen gas is designed to be generated continuously by opening and closing the plurality of automatic valves in a predetermined order. For example, the nine steps shown in FIG. 2 are repeated to separate oxygen from nitrogen contained in a gaseous mixture mainly containing oxygen and nitrogen, for example, air to obtain oxygen as a final product.

An embodiment of the process for generating oxygen according to the present invention will be described below referring to the process cycle chart shown in FIG. 2 in which the oxygen PSA is employed.

First, in Step 1, the adsorption column A is performing an adsorption step where oxygen is separated from nitrogen; whereas the adsorption columns B,C are performing pressure equalization steps, and the relatively oxygen rich gas remaining in the adsorption column B having completed the adsorption step is being fed to the adsorption column C having completed a vacuum purge step.

Specifically, raw material air pressurized by the low-pressure blower 12 to a predetermined pressure level, e.g. 500 mmAq (mmAq=millimeter of water) (ca. 800 Torr), is introduced through the air inlet valve 21a into the adsorption column A, where nitrogen contained in the air is adsorbed on zeolite packed in the column A to be separated to oxygen, and the less strongly adsorbable component oxygen is taken out of the product outlet valve 22a as a product oxygen to be fed into the product storage tank 14.

Meanwhile, the adsorption column B having completed the adsorption step to have an internal pressure of 500 mmAq and the adsorption column C having completed the vacuum purge step to have an internal pressure of 200 Torr are allowed to communicate to each other on the product discharge sides and on the raw material supply sides, respectively, so that the gas contained in the adsorption column B can be introduced from the top and bottom to the adsorption column C. In other words, the gas present at the top of the adsorption column B flows through the pressure equalizer valve 24b to be introduced to the top of the adsorption column C through the repressurization valve 23c of the column C under control of flow rate by the flow control valve 16; whereas the gas present at the bottom of the adsorption column B flows through the evacuation valve 25b into the discharge pipe 18 to be introduced to the bottom of the adsorption column C through the evacuation valve 25c of the adsorption column C.

In this process, while the evacuation valve 25c of the adsorption column C is assuming a full-open stale continuous from the vacuum purge step, the discharge valve 25b of the adsorption column B assuming a full-closed state in the adsorption step is opened gradually to assume a full-open state. Accordingly, the gas present at the top of the adsorption column B travels to the top of the adsorption column C under control by the flow control valve 16 to a predetermined flow rate; whereas the gas present at the bottom of the adsorption column B travels to the bottom of the adsorption column C steadily increasing its flow rate in proportion to the valve opening speed of the evacuation valve 25b. Further, the gas flowing from the bottom of the adsorption column B to the bottom of the adsorption column C is partly discharged by the vacuum pump 13 through the discharge piping 18.

In Step 2, the adsorption column A is still performing the adsorption step; whereas the adsorption column B is performing an evacuation step (a kind of regeneration step), and the adsorption column C is performing a product repressurization step using the product oxygen gas. Specifically, the gas remaining in the adsorption column B is discharged by the vacuum pump 13 through the evacuation valve 25b and the discharge piping 18 to allow the nitrogen content adsorbed on the adsorbent in the column B to be desorbed and discharged. Meanwhile, in the adsorption column C, the evacuation valve 25c is closed and the main repressurization valve 26 is opened to allow the product oxygen gas in the product storage tank 14 to be partly introduced to the adsorption column C through the repressurization valve 23c under control of flow rate by the flow control valve 15.

In Step 3, the adsorption column A is still performing the adsorption step; whereas the adsorption column B is performing the vacuum purge step, and the adsorption column C is still performing the product repressurization step. Specifically, in the adsorption column B, the repressurization valve 23b is opened under continuous evacuation by the vacuum pump 13 to allow the product oxygen gas in the product storage task 14 to be partly introduced to the top of the column B through the flow control valve 15 and the main repressurization valve 26. As described above, by evacuating the adsorption column from the raw material supply side while introducing the product oxygen gas from the product discharge side, desorption of nitrogen can be notably accelerated compared with the case where evacuation only is carried out. Further, the internal pressure of the adsorption column C is increased finally to 500 mmAq which is substantially equal to the adsorption operating pressure in the product repressurization step performed continuous from Step 2.

In Step 4, the adsorption column A is switched to the pressure equalization step on the gas-releasing side like the adsorption column B in Step 1; whereas the adsorption column B is switched to the pressure equalization step on the gas receiving side like the adsorption column C in Step 1 and the adsorption column C is switched to the adsorption step like the adsorption column A in Step 1, respectively. In Step 5, the adsorption column C is continuously performing the adsorption step; whereas the adsorption columns A and B are switched to the evacuation step and to the product repressurization step, respectively. In Step 6, the adsorption columns C and B are continuously performing the adsorption step and the product repressurization step, respectively; whereas the adsorption column A is switched to the vacuum purge step.

In Steps 7, 8 and 9, the adsorption columns C, A and B are performing the state of the adsorption column A, the state of the adsorption column B and the state of the adsorption column C in Steps 4 to 6, respectively. Upon completion of Step 9, the states of the adsorption columns are returned to Step 1.

As described above, by repeating Steps 1 to 9 in the respective adsorption columns the product oxygen can be collected continuously from the adsorption columns performing the adsorption step.

In the process described above, by subjecting the relatively oxygen rich gas present in the adsorption column having completed the adsorption step to the pressure equalization step where it is recovered into the adsorption column having completed the vacuum purge step, recovery ratio of the product can be improved, and further the amount of product gas to be generated per amount of adsorbent can be increased by adjusting the pressure equalization level in the pressure equalization step. Further, idle time of the vacuum pump can be canceled by carrying out evacuation also during the pressure equalization step.

It should be noted, however, that in the transference of the pressure equalized gas on the feed side (inlet side) of the adsorption column in the pressure equalization step, if the evacuation valve is merely opened to start transference of the gas, the gas flows at a very high rate from the gas-releasing side adsorption column toward the gas-receiving side adsorption column. Accordingly, it can happen that the adsorptive component nitrogen breaks through up to the top of the gas-receiving side adsorption column to lower performance of the apparatus or blows up the adsorbent to cause powdering of the adsorbent. The pressure equalization operation on the product discharge side likewise suffers the problems of flowing of nitrogen gas into the gas-receiving side adsorption column and so on.

Meanwhile, if the amount of incoming pressure equalized gas is limited too much so as to avoid the problems described above, the gas cannot be fully recovered within a predetermined time of the pressure equalization step, resulting in the failure of attaining the desired product recovery ratio. As described above, recovery of the gas in the pressure equalization step in a too much amount or in a too small amount affects greatly the performance of the apparatus.

Meanwhile, when the pressure equalization operation is carried out at the top and bottom of the adsorption column simultaneously, the balance between the amounts of the pressure equalized gas (recovery gas) at the top and bottom of the column must be taken into consideration. The recovery of the gas to be achieved by the top pressure equalization is preferably in the range of ½ to ¾, most preferably in the range of about ⅗ of the total gas recovery. On the other hand, recovery of the gas to be achieved by the bottom pressure equalization is preferably in the range of ¼ to ½, most preferably about ⅖ of the total gas recovery.

While the ratio of recovery gas is expressed here quantitatively, this ratio can be found by monitoring change in the internal pressure of the adsorption column in an actual adjustment procedures. For example, when the pressure equalization operation is carried out with respect to an adsorption column having completed the adsorption step at 800 Torr and an adsorption column having completed the vacuum purge step at 200 Torr, these two adsorption columns are allowed to have an equal pressure of 500 Torr at the maximum by securing communication between them. The actual value is less than 500 Torr under the influence of curve character of the adsorptive isothermal curve of the adsorbent. Further, the pressure equalization operation is occasionally terminated intentionally before the pressure is equalized.

In this case, while an amount of gas corresponding to 300 Torr is recovered, it is preferred that ⅗, i.e. corresponding to 180 Torr, of that gas is recovered by means of top pressure equalization and that 120 Torr portion of that gas is recovered by means of bottom pressure equalization. Such allocation of the gas recovery is preferably achieved, in the top pressure equalization, by maintaining the flow rate of the gas substantially at a constant level with the aid of the flow control valve 16 disposed on the piping, and in the bottom pressure equalization, by adjusting the valve opening speed of the gas-releasing side evacuation valve to increase gradually the flow rate.

The valve opening speed of the evacuation valve can be controlled, for example, by incorporating a speed controller to a pneumatic system for instrumentation employed for opening and closing the evacuation valve to retard the action of opening the evacuation valve.

FIG. 3 shows relationship between gas flow rate and the apertures of the equalizer valve locating on the gas releasing side and of the repressurization valve locating on the gas receiving side, in the top pressure equalization operation. In this top pressure equalization operation, the repressurization valve is assuming a full-open state continuous from the previous vacuum purge step, and the equalizer valve assumes a full-open state immediately after the pressure equalization step is started, but the gas flow rate is controlled by the flow control valve 16.

FIG. 4 shows relationship between gas flow rate and aperture of the evacuation valve locating on the gas releasing side, in the bottom pressure equalization operation. This chart shows flow rate X of the gas flowing out of the gas-releasing side adsorption column and flow rate Y of the gas flowing to the gas-receiving side adsorption column.

Specifically, in the bottom pressure equalization operation, the gas-receiving side evacuation valve is assuming a full-open state continuous from the previous vacuum purge step, and the gas-releasing side evacuation valve is gradually opened to the fully-open state after initiation of the pressure equalization step to the end of this step. While the gas-releasing side evacuation valve is particularly preferably designed to be opened utilizing the entire period of the pressure equalization step to assume the full-open state at the end of this period, the time until the full-open state is attained is mere preferably 80% of the total period of the pressure equalization step. While the gas flow rate increases as the gas-releasing side evacuation valve opens, the gas flowing cut of the gas-releasing side adsorption column is partly discharged by the vacuum pump 13 through the discharge pipe 12, so that the amount of gas flowing into the gas-receiving side adsorption column is reduced that much.

Accordingly, in the top pressure equalization operation, the amount of gas (hatching in FIG. 3) can be set at a desired level by controlling the gas flow rate by the flow control valve 16 or by adjusting the gas flow rate by a flow control mechanism attached to the equalizer valve. Meanwhile, in the bottom pressure equalization operation, the amount of gas (hatching in FIG. 4) can be set at a desired level by changing the gas flew rate with the gas-releasing side discharge valve. By performing these top and bottom pressure equalization operations, the amount of gas can be allotted as described above.

In performing pressure equalization operations at the top and bottom of the adsorption column simultaneously, the abruptly flowing gas is prevented from the gas-releasing side adsorption column into the gas-receiving side adsorption column by increasing gradually the gas flow rate in the bottom pressure equalization as described above and carrying out evacuation simultaneously. Besides, since flowing of the undesired nitrogen (easily adsorptive component) into the gas-receiving side adsorption column can be avoided, not only oxygen recovery ratio but also the amount of oxygen generated per amount of adsorbent can be improved.

While bottom pressure equalization is carried out utilizing the discharge pipe 18 to simplify the equipment in this embodiment, an extra pipe and an extra valve for the bottom pressure equalization may be incorporated so that control of flow rate may be adapted to be carried out by another valve incorporated for such purpose. Meanwhile, the number of adsorption columns is not limited to three, and the present invention can be applied to apparatuses having two columns or 4 or more columns. Further, as the adsorbent employed in the oxygen PSA, there may be employed zeolite which preferentially adsorbs nitrogen in larger amount than oxygen, for example, so-called MS-5A, MS-10X, MS-13X, mordenite and zeolite the metals in which are ion-exchanged to have a pore size such that it may adsorb nitrogen at a sufficient adsorption rate. Moreover, the gaseous mixture primarily containing oxygen and nitrogen is not limited to air, and gaseous mixtures of desired compositions can be employed.

The process of the present invention can be applied to apparatuses for separating various kinds of more strongly adsorbable gaseous components from less strongly adsorbable gaseous components. This process can be applied, for example, to a nitrogen PSA for obtaining nitrogen gas as a final product by employing carbon molecular sieves as the adsorbent.

Next, tests were carried out using the thus constituted apparatus under control of flow rate (Test 1) and under no control of flow rate (Test 2) in the bottom pressure equalization operation according to the process of the invention to measure the amount of oxygen generated and % oxygen recovery ratio.

There were employed adsorption columns having an inner diameter of 155 mm and a height of 1.6 m and molecular sieves 5A having a form of pellet with a diameter of 1.6 mm as the adsorbent. The apparatus was operated under the following conditions: adsorption pressure: 500 mmAq; evacuation pressure: 200 Torr; cycle time: 60 sec; period of pressure equalization step: 5 sec. The test results are as indicated below. Concentration of the product oxygen obtained in each test was 93%.

|  | Amount of oxygen generated | Oxygen recovery ratio |
|---|---|---|
| Test 1 | 1.15 Nm$^3$/h | 58% |
| Test 2 | 0.95 Nm$^3$/h | 53% |

Incidentally, Nm$^3$/h expresses volume in the meterage unit per hour calculated in terms of the condition of 0° C. and 1 atm.

Next, procedures of changing the flow rate of product oxygen gas fed from the product gas feed piping 31 to the spot where it is consumed will be described referring to FIG. 1.

In the case where the total amount of product oxygen gas generated from the PSA apparatus shown in FIG. 1 is supplied to the spot where it is consumed, the circulatory flow control valve 35 is assuming a full-closed state, and the total amount of product oxygen gas compressed in the product gas compressor 32 is supplied to the spot through the control valve 33.

When the product oxygen gas, which is currently fed in the total amount, is to be fed in a reduced amount, an operator inputs a necessary reductive value to the controller 36. The controller 36 opens the circulatory flow control valve 35 to a predetermined aperture depending on the input reductive value.

The aperture of the circulatory flow control valve 35 can be adjusted by finding preliminarily a suitable valve aperture corresponding to the reductive amount and by setting this valve aperture by an aperture setting device. Here, since it is essential that the valve aperture of the circulatory flow control valve 35 can be changed automatically, a pneumatic automatic valve, a motor-driven valve, etc. must be employed.

Thus, the product oxygen gas compressed by the product gas compressor 32 partly flows through the circulatory passage 34 to return to the inlet side of the compressor 32, so that the amount of product oxygen gas to be supplied through the control valve 33 to the spot is reduced.

Simultaneously, the controller 36 controls the aperture of the control valve 33 depending on gas flow conditions preset based on the measured values of the pressure gauge P and/or the flow meter F. For example, if the spot where the product oxygen gas is consumed is an electric furnace and the like which hates pressure fluctuation, a pressure control valve is mainly employed as the control valve 33, and the aperture of the valve 33 is controlled based on the measured value of the pressure gauge P to feed a predetermined pressure level of product oxygen gas to the spot. Meanwhile, if the spot where the product oxygen gas is consumed is an equipment related to paper pulp industry and the like which hates flow rate fluctuation, a flow control valve is mainly employed as the control valve 33, and the aperture of the valve 33 is adjusted based on the measured value of the flow meter F to feed a predetermined flow rate of product oxygen to the spot.

When the amount of gas, which is currently fed in a reduced amount, is to be further reduced, a reductive value is likewise said above input to the controller 36 to open the circulatory flow control valve 35 to a predetermined aperture and to increase the amount of product oxygen gas returning to the inlet side of the product gas compressor 32, thus reducing further the amount of product oxygen gas to be supplied through the control valve 33 to the spot. Simultaneously, the control valve 33 is adjusted to an aperture depending on gas flow conditions preset based on the measured values of the pressure gauge P and/or the flow meter F.

When the amount of gas, which is currently fed in a reduced amount, is to be increased, the operator inputs an incremental value to the controller 36. The controller 36 closes the circulatory flow control valve 35 to a predetermined aperture depending on the input incremental value. Thus, the amount of product oxygen gas to be returned to the inlet side of the product gas compressor 32 is reduced, and the amount of product oxygen gas to be supplied through the control valve 33 to the spot is increased. Simultaneously, the control valve 33 assumes an aperture depending on gas flow conditions preset based on the measured values of the pressure gauge P and/or the flow meter F. When the total amount of product oxygen gas is supplied to the spot, the circulatory flow control valve 35 is allowed to assume a full-closed state by inputting necessary data to the controller 36.

The gas feed amount can be changed automatically in a short time by controlling the feed amount of product oxygen gas as described above. Such control method is particularly effective in such a spot where the gas is consumed as there is small variation in the amount of product gas to be consumed and the product gas is consumed under a relatively constant pressure/flow rate.

Incidentally, during feeding of the product oxygen gas in a reduced amount, since the product oxygen gas is partly returned through the circulatory passage 34 to the inlet side of the product gas compressor 32 of the product gas feed piping 31, also in the PSA apparatus 11, it is preferred to prolong the cycle time, as has been conventionally practiced, depending on the reductive value of the product oxygen gas and to perform procedures of reductive operational, for example, reduction of power consumption by idling the vacuum pump and the like in the prolonged time none, so as to reduce the amount of oxygen gas to be generated.

Meanwhile, control of the feed amount of raw gas in operating the PSA apparatus 11 according to the turn down mode is carried out in different ways depending on the types of the compressor for feeding the raw material gas and of the blower. In the low-pressure blower having a maximum delivery pressure of about 1000 mmAq which is frequently employed in a large-scale oxygen PSA apparatus having an adsorption pressure of around atmospheric pressure, the gas delivery (gas volume) changes greatly depending on the delivery pressure of the blower as indicated by the curves R, S and T in FIG. 5.

Figure 5:
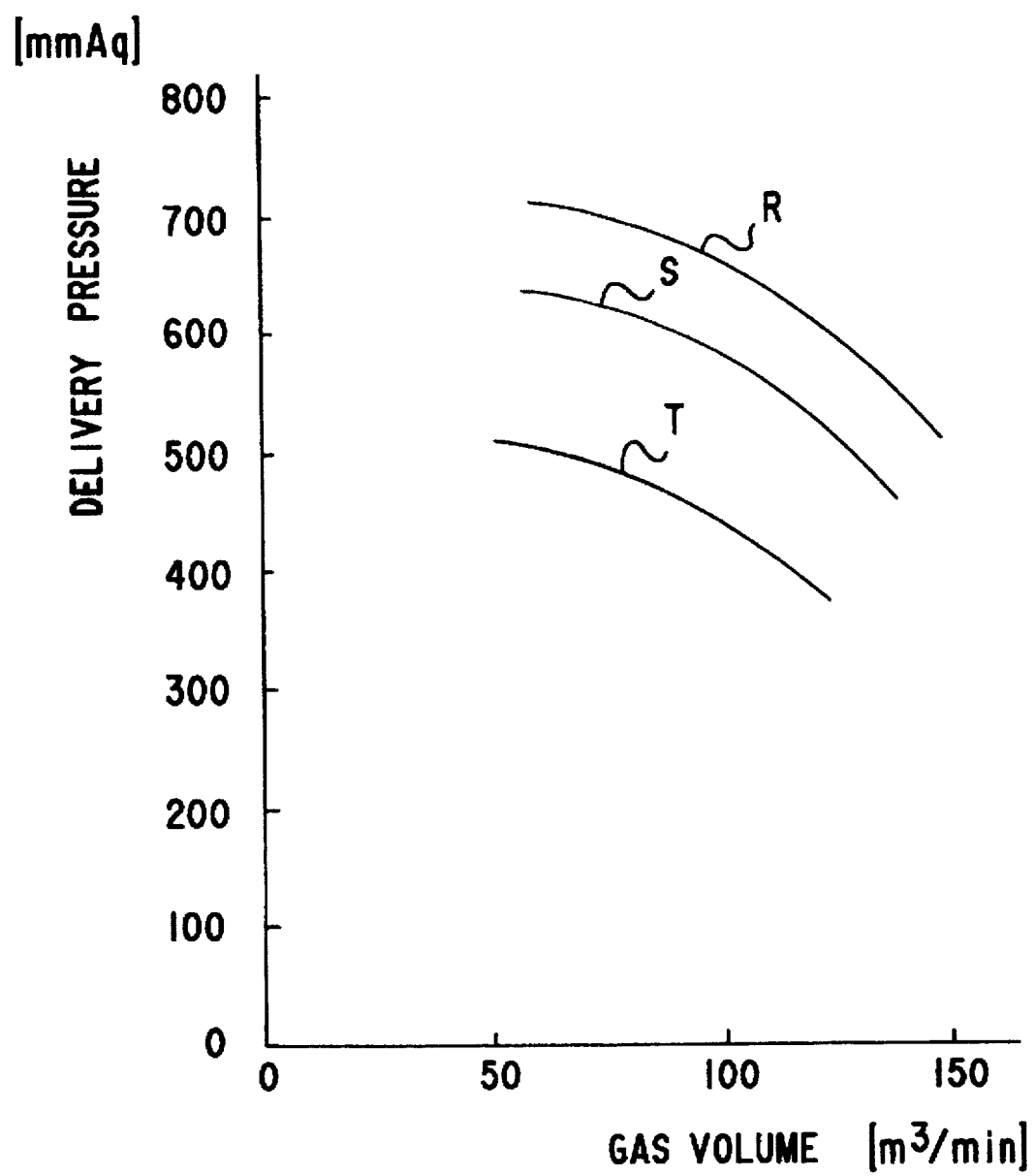
FIG. 5 is a graph showing relationship between discharge pressure of a low-pressure blower and gas delivery volume in the apparatus shown in FIG. 1.

In the normal operational state of the PSA apparatus 11, for example, when a blower having the characteristics as indicated by the curve R in FIG. 5 is employed, the gas volume under an adsorption pressure of about 500 mmAq is about 150 m³/min. However, since the product gas is partly returned through the circulatory passage 34 to the inlet side of the product gas compressor 32 of the product gas feed piping 31, the pressure on the outlet side of the adsorption column is increased. Upon the adsorption pressure reaching, for example, about 700 mmAq, the amount of the gas delivered from the low-pressure blower is reduced to about 70 m³/min in accordance with the characteristics of this blower. That is, when a low-pressure blower is employed, the amount of raw material air can be controlled by merely performing flow rate control in the product gas flow passage.

Next, the process of the present invention was performed as a test example using the oxygen PSA apparatus under the following conditions. The test example will be described below.

Product oxygen gas flow rate: 1000 Nm³/h (under 100% operation)

Product oxygen gas pressure: 9.5 kg/cm².G

Flow rate change condition: 75% and 50%

First, a turn down mode of 75% (50%) is selected in the controller 36 rising a selecting switch. Then, a signal corresponding to the 75% (50%) operational mode is transmitted from the controller 36 to the circulatory flow rate control valve 35, and the aperture of the control valve 35 is changed instantaneously to a degree corresponding to the selected mode.

Meanwhile, when a pressure control valve is employed as the control valve 33, the pressure gauge P detects change of pressure in the product gas feed piping 31 to be caused by the change in the aperture of the circulatory flow control valve 35 of the product gas compressor 32, and the aperture of the control valve 33 is controlled automatically to provide a pressure preset in the pressure controller. Consequently, the amount of gas flowing through the product gas feed piping 31 can be converged to the preset flow rate value according to the turn down mode. The state of gas flow rate and the state of gas pressure in this case are indicated in FIG. 6, and results of operational tests are as described below.

Results of operational tests:

| Mode | Flow rate [Nm³/h] | Pressure [kg/cm².G] | Time until convergence |
|---|---|---|---|
| 75% | 750 | 9.5 | 2 min |
| 50% | 500 | 9.5 | 2 min |

Incidentally, when a flow control valve is employed as the control valve 33, the circulatory flow control valve 35 is operated depending on the pressure change, and the control valve 33 is operated so as to attain the product gas flow rate corresponding to the turn down mode.

FIG. 7 is a system chart showing an example of pressure swing adsorption apparatus for practicing another embodiment of the present process.

In FIG. 7, the product gas feed piping 31, product gas compressor 32, control valve 33, circulatory route 34, circulatory flow control valve 35, flow meter F and pressure gauge P are of the constitutions and have functions similar to those with the same reference numbers as in FIG. 1, respectively.

The reference number 41 denotes a controller for inputting signals for changing the feed amount of product gas. The controller 41 controls the apertures of the circulatory flow control valve 35 and of the control valve 33 under measuring of the flow rate and pressure of the product gas by the flow meter F and the pressure gauge P. Further, the controller 41 transmits signals for changing the operational mode of the PSA apparatus 11 to a valve controlling section 19 of the apparatus 11.

Next, the procedures of changing the flow rate of product oxygen gas to be supplied through the product gas feed piping 31 to the spot where it is consumed will be described referring to FIG. 7.

When the total amount of product oxygen gas generated from the PSA apparatus 11 shown in FIG. 7 is being supplied to the spot where it is consumed, the circulatory flow control valve 35 is assuming a full-closed state like in the embodiment shown in FIG. 1.

When the product oxygen gas, which is currently fed in the total amount, is to be fed in a reduced amount, an operator inputs a necessary reductive value to the controller 41. The controller 41 opens the circulatory flow control valve 35 or closes the control valve 33, to a preset aperture depending on the input reductive value.

Further, the controller 41 controls the aperture of the control valve 33 depending on gas flow conditions preset based on the measured values of the pressure gauge P and/or the flow meter F. For example, when the spot where the product oxygen gas is to be consumed hates pressure fluctuation, a pressure control valve is mainly employed as the control valve 33, and the aperture of the control valve 33 is controlled based on the measured value of the pressure gauge P.

Thus, the amount of product oxygen gas to be fed to the spot is changed to the preset reduced level.

When the feed amount of product oxygen is adjusted substantially to the preset pressure or flow rate after completion of reduction, the controller 41 outputs a signal for changing the operational mode corresponding to the reductive value to the valve controlling section 19 of the PSA apparatus 11. Thus, the valve controlling section 19 changes the timing of opening and closing, for example, the automatic valves 21,22,23,24,25,26 shown in FIG. 1 in accordance with the operational mode, and the PSA apparatus operates under the turn down mode, for example, under extension of cycle time, which has been conventionally practiced, to reduce power consumption and the like by idling the vacuum pump etc. in the prolonged time zone.

Meanwhile, when the amount of product oxygen gas, which is currently fed in a reduced amount, is to be increased, the operator inputs an incremental value to the controller 41. The controller 41 having received the incremental signal outputs a signal for changing the operational mode corresponding to the incremental value to the valve controlling section 19 of the PSA apparatus 11. The valve controlling section 19 having received the signal changes the timing of opening and closing, for example, the automatic valves 21,22,23,24,25,26 shown in FIG. 1 in accordance with the operational mode, and thus the PSA apparatus 11, the cycle time of which is changed, operates in accordance with the predetermined operational mode.

After the operational state of the PSA apparatus 11 is stabilized, the controller 41 operates the circulatory flow control valve 35 to the closing direction to the aperture corresponding to the incremental value and also controls the control valve 33 to have an aperture corresponding to the thus increased feed amount of product gas. Accordingly, the amount of product oxygen gas to be supplied to the spot is changed to the preset increased flow rate.

It should be noted here that, since the signal for starting the reductive or incremental operation can be input in any arbitrary time zone of the step switching period in the PSA apparatus 11, it is not desirable to respond to such signal instantaneously each time, because the system is complicated. Accordingly, even if Such signal is input at any point of a step, the procedures of controlling the flow rate or of changing the operational mode are not executed until the next step switching timing, but such procedures are started at such timing. Further, the change of the operational mode of the PSA apparatus 11 to the turn down mode can be ensured by counting beforehand the cycle numbers until the flow rate of the product gas is converged to the preset value after the flow controlling procedures are started, and by inputting the thus counted value into the program. Namely, the timing of changing of the cycle time during flow rate control is decided by the converging time in the control valve 33.

The procedures of changing the flow rate of product gas according to this embodiment can be applied only to the case where the raw material air is fed by a low-pressure blower like in the oxygen PSA.

FIGS. 8 to 11 show an example of relationship among the operational mode M of the PSA apparatus 11, flow rate set value Fm of the control valve 33 (flow control valve) and actual flow rate G of product oxygen gas, when the operational mode is switched to a reductive or incremental operational mode. The apparatus was operated in accordance with three operational modes: 100%, 75% and 50%. Cycle times in each mode of the PSA apparatus were 60, 80 and 120 seconds, respectively.

Figure 8:
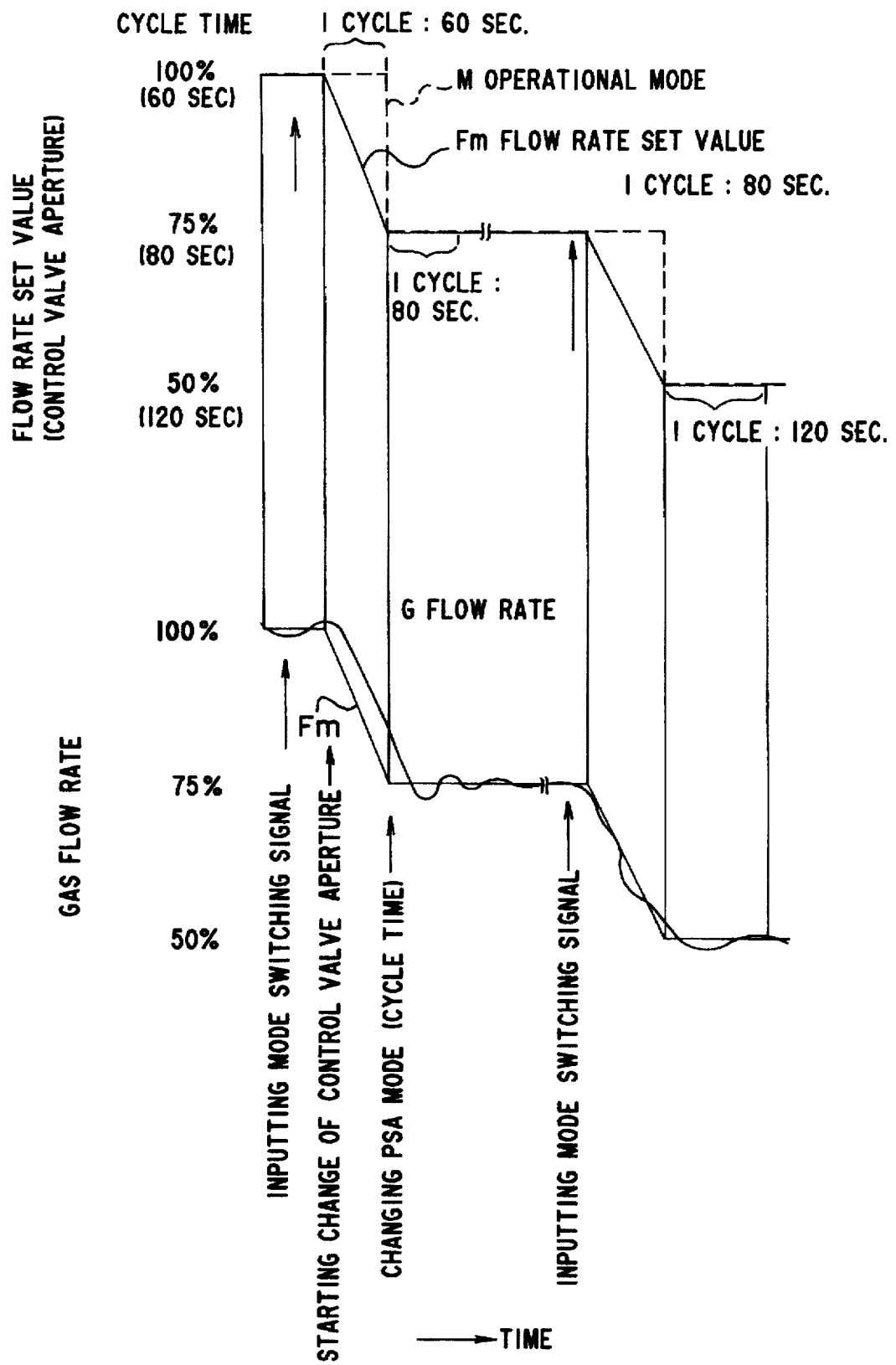
FIG. 8 is a chart showing relationship, in the apparatus shown in FIG. 7, among the operational mode of the PSA apparatus, flow rate set value of the flow control valve and actual flow rate of product oxygen, when the operational mode is switched to a reductive operational mode.

In FIG. 8, when a reductive signal from 100% operation to 75% operation is input to the controller 41, an aperture changing signal is output from the controller 41 to the flow control valve 33 at the step switching timing to the next cycle to change the aperture of the control valve 33 to a preset aperture corresponding to the flow rate of 75%. The flow rate value Fm is preset to attain the aperture change ever one cycle time, in this case over 60 seconds, so that the system may not be affected by such abrupt change in the flow rate. Accordingly, the aperture of the flow control valve 33 is gradually adjusted to the flow rate set value Fm. At the point where the flow rate G reaches the predetermined level of 75%, a signal for changing the operational mode is transmitted from the controller 41 to the valve controlling section 19, and the operational mode M of the PSA apparatus is changed to the mode corresponding to the 75% reductive operation. Further, the cycle time is changed from 60 seconds to 80 seconds.

Moreover, when a 50% reductive operational signal is input to the controller 41 during the 75% reductive operation, an aperture changing signal is input to the flow control valve 33 at the step switching timing to the next one cycle, and thus the aperture of the flow control valve 33 is reduced to the preset aperture corresponding to the 50% flow rate. The flow rate value Fm in this aperture change is also set such that the flow rate may be changed to 50% in 80 seconds which corresponds to one cycle time, and the aperture of the flow control valve 33 is gradually controlled according to this flow rate set value Fm. At the point where the flow rate G substantially reaches the predetermined level of 50%, the operational mode M of the PSA apparatus 11 is changed to correspond to the 50% reductive operation, and the cycle time is changed from 80 seconds to 120 seconds.

Figure 9:
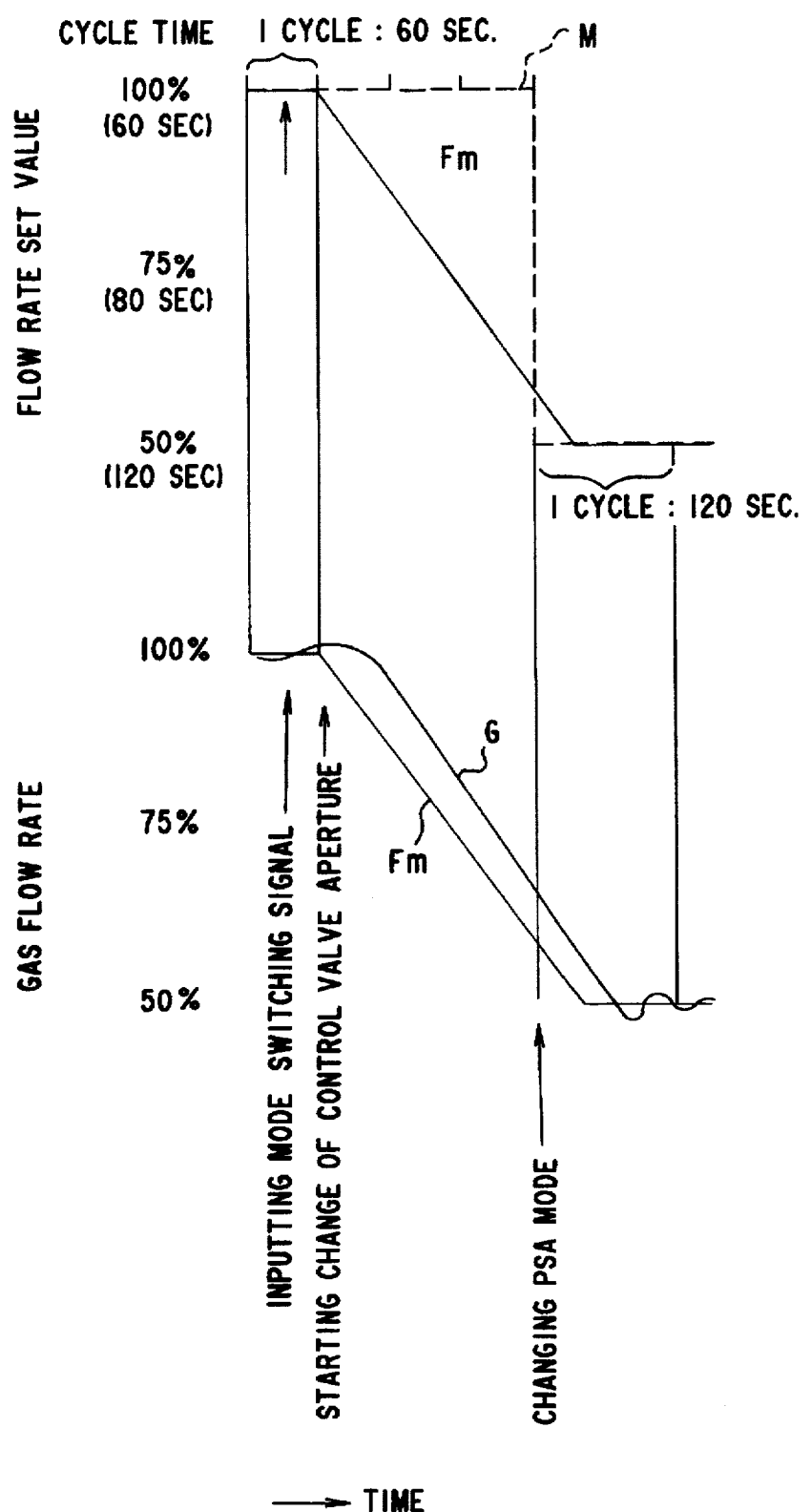
FIG. 9 is a chart showing relationship, in the apparatus shown in FIG. 7, among the operational mode of the PSA apparatus, flow rate set value of the flow control valve and actual flow rate of product oxygen, when the operational mode is switched to another reductive operational mode.

Meanwhile, as shown in FIG. 9, when a 50% reductive operational signal is input to the controller 41 during 100% operation, an aperture changing signal is input to the flow control valve 33 at the step switching timing to the next one cycle, and thus the aperture of the flow control valve 33 is changed gradually to the preset level corresponding to the 50% flow rate over about 180 seconds which corresponds to three cycle time. When the flow rate G is about to reach the predetermined level of 50%, the operational mode M of the PSA apparatus 11 is changed to correspond to the 50% reductive operation, and the cycle time is changed from 60 seconds to 120 seconds.

As described above, in the procedures of switching to a reductive operation, after the flow rate of the product gas is reduced by the flow control valve 33 corresponding to the degree of reductive operation, the operational mode of the PSA apparatus 11 is changed corresponding to the reduced flow rate. Thus, the PSA apparatus can be operated stably, and the product is prevented from lowering purity and so on.

Figure 10:
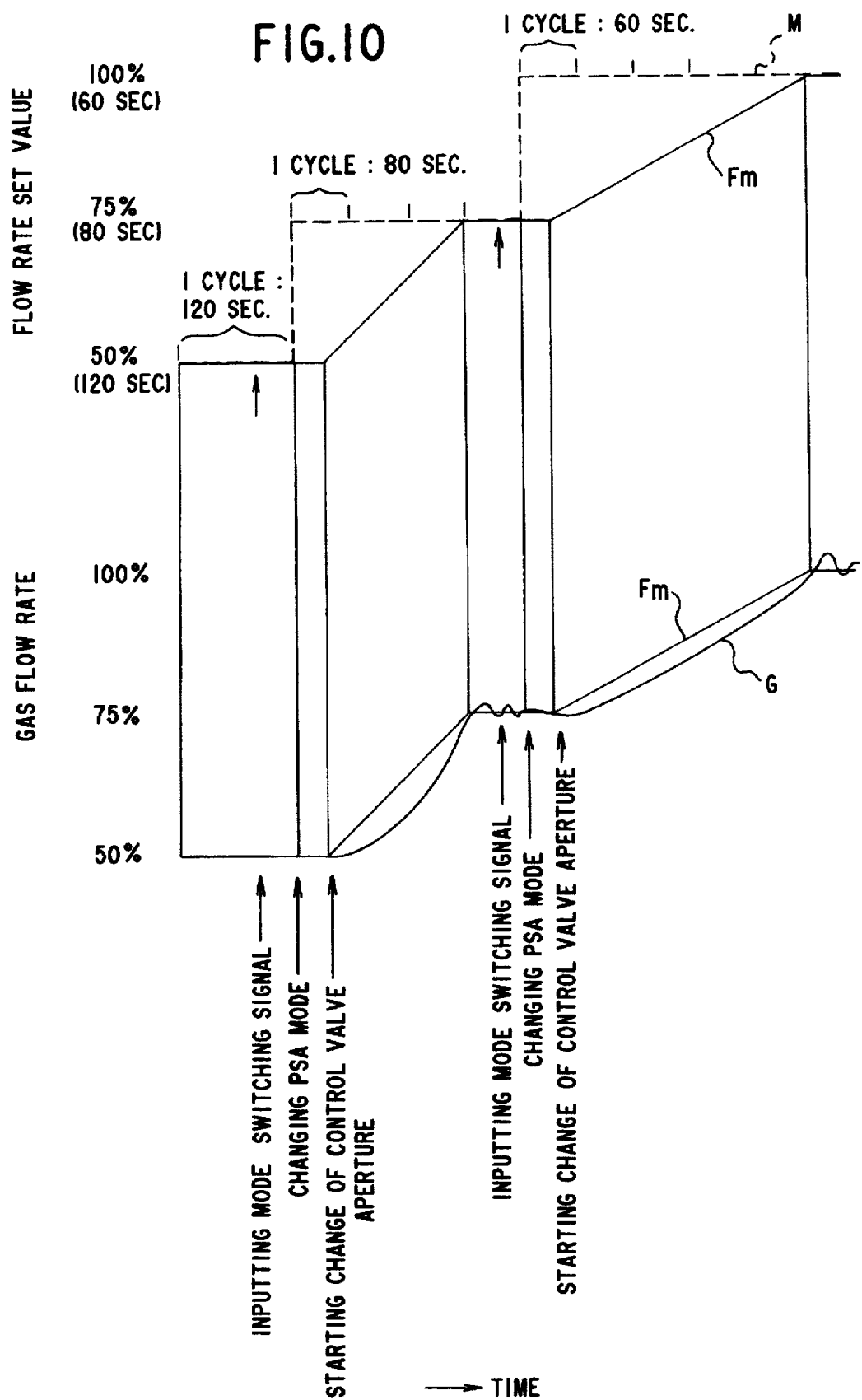
FIG. 10 is a chart showing relationship, in the apparatus shown in FIG. 7, among the operational mode of the PSA apparatus, flow rate set value of the flow control valve and actual flow rate of produce oxygen, when the operational mode is switched to an incremental operational mode.

FIGS. 10 and 11 each show a state where the system performing a reductive operation is switched to the normal 100% operation or from the 50% reductive operation to 75% reductive operations.

In FIG. 10, when the 50% reductive operation is switched to the 75% reductive operation, an incremental signal is input to the controller 41 to change the operational mode of the PSA apparatus 11 corresponding to the 75% reductive operation at the next step switching timing, and the cycle time is changed from 120 seconds to 80 seconds. Next, an aperture changing signal is output from the controller 41 to the flow control valve 33 to change the aperture of the flow control valve 33 to correspond to the flow rate of 75%.

The flow rate value Fm in changing the aperture of the flow control valve 33 is set to increase the flow rate G gradually for about 240 seconds corresponding to three cycle time after the operational mode of the PSA apparatus 11 is changed.

Meanwhile, when the 75% reductive operation is switched to increase to the 100% operation, the cycle time of the PSA apparatus 11 is designed to be changed likewise said above from 80 seconds to 60 seconds at the next step switching timing, and then the flow rate set value Fm of the flow control valve 33 is changed over 300 seconds corresponding to 5 cycle time to a level corresponding to 100% flow rate.

Further, as shown in FIG. 11, when the 50% reductive operation is switched to increase to the 100% operation, the cycle time of the PSA apparatus 11 is first changed likewise said above from 120 seconds to 60 seconds, and then the flow rate set value Fm of the flow control valve 33 is changed to a level corresponding to 100% flow rate over 600 seconds which corresponds to 10 cycle time.

As described above, in the procedures of switching to an incremental operation, the operational mode of the PSA apparatus is changed to correspond to the degree of incremental operation, and then the flow rate of the product gas is adjusted to be controlled by the flow control valve 33 to a predetermined level. Thus, the PSA apparatus 11 can be operated stably, and the product is prevented from lowering purity and so on. This is because breakthrough of the mass transfer zone (MTZ) in the adsorption column, i.e. breakthrough of the adsorbent, can be avoided by achieving change of the operational mode to reductive or incremental operation in the order as described above.

As described in this embodiment, the circulatory passage 34 having the circulatory flow control valve 35 is connected to the discharge side and inlet side of the product gas compressor 32 to control the aperture of the circulatory flow control valve 35 so as to increase or reduce the amount of product gas flowing from the product gas compressor 32 to the flow control valve 33 side, or a flow control system resorting to an unload valve attached to the product compressor may be employed to achieve control of flow rate and pressure stably compared with the case where the flow rate control is achieved by the flow control valve 33 only.

Further, in a possible constitution, the flow rate of the product oxygen gas to be supplied from the product gas feed piping 31 to the spot where it is consumed may be controlled by the circulatory flow control valve 35, and a pressure control valve is disposed as the control valve 33, in place of the flow control valve, on the product gas feed piping 31 so as to maintain the pressure of the product gas to be supplied to the spot at a constant level.

In other words, the amount of product gas flowing into the product gas feed piping 31 can be reduced by returning partly the product oxygen gas delivered from the product gas compressor 32 by opening the circulatory flow control valve 35 to the inlet side of the product gas compressor 32. Further, since the amount of product gas flowing into the product gas feed piping 31 can be increased by closing the circulatory flow control valve 35, the amount of product gas can be maintained at a desired flow level by merely adjusting the aperture of the circulatory flow control valve 35, provided that the aperture of the circulatory flow control valve 35 is preset corresponding to the degree of reductive operation. In addition, the product oxygen gas can be supplied to the spot substantially at a constant pressure level irrespective of the flow rate of the product gas by disposing a pressure control valve on the product gas feed piping 31.

While the signal for changing the feed amount of product gas may be input to the controller by an operator as described above, it is also possible to allow a sensor (e.g., a flow meter F) to detect change in the flow rate of the oxygen gas which is caused by the change in the amount of gas consumed on the spot and to input the detection signal to the controller.

Incidentally, the procedures of practicing the process of the present invention are described with respect to the oxygen PSA as an example in any of the foregoing embodiments, it is also possible to apply the process of the present invention to other PSA apparatuses including nitrogen PSA, carbon dioxide PSA, hydrogen PSA, etc. in the same manner as described above.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope of the appended claims.

What is claimed is:

1. A pressure swing adsorption process which comprises:
    switching a plurality of adsorption columns packed with an adsorbent successively to an adsorption step, a first pressure equalization step, an evacuation step, a vacuum purge step, a second pressure equalization step and a repressurization step to allow a more strongly adsorbable component gas contained in a gaseous mixture to be adsorbed on the adsorbent and to separate a less strongly adsorbable component gas; and
    compressing the thus separated less strongly adsorbable component gas by a product gas compressor to supply it as a product gas;
    wherein a first adsorption column having completed said adsorption step and a second adsorption column having completed said vacuum purge step are allowed to communicate to each other on product discharge sides and on raw material supply sides respectively in said first pressure equalization step of the first adsorption column and said second pressure equalization step of said second adsorption column, to recover the remaining gas in the first adsorption column under gradual increase of gas flow rate on the raw material supply side and also to evacuate said first adsorption column having completed said adsorption step.

2. The pressure swing adsorption process according to claim 1, wherein gas recovery flowing from the product discharge side of said first adsorption column to the product discharge side of said second adsorption column is in the range of ½ to ¾ of total gas recovery, whereas gas recovery flowing from the raw material supply side of said first adsorption column to the raw material side of said second adsorption column is ¼ to ½ of the total gas recovery.

3. A pressure swing adsorption process which comprises:
    switching a plurality of adsorption columns packed with an adsorbent successively to an adsorption step, a first pressure equalization step, an evacuation step, a vacuum purge step, a second pressurization equalization step and a repressurization step to allow a more strongly adsorbable component gas contained in a gaseous mixture to be adsorbed on the adsorbent and to separate a less strongly adsorbable component gas; and
    compressing the thus separated less strongly adsorbable component gas by a product gas compressor to supply it as a product gas;
    wherein procedures of changing a feed amount of product gas is carried out by inputting a signal for changing the feed amount of product gas:
        a. to control an aperture of a circulatory flow control valve disposed on a circulatory passage connecting a discharge side and inlet side of said product gas compressor to control the amount of gas circulating from the discharge side to the inlet side of said compressor, whereby to control the amount of product gas delivered from said product gas compressor to a product gas feed passage to a preset flow rate after the change; and
        b. to control an aperture of a control valve disposed on said product feed passage to a level corresponding to predetermined gas flow conditions.

4. The pressure swing adsorption process according to claim 3, wherein a first adsorption column having completed said adsorption step and a second adsorption column having completed said vacuum purge step are allowed to communicate to each other on product discharge sides and on raw material supply sides respectively in said first pressure equalization step of the first adsorption column and said second pressure equalization step of said second adsorption column, to recover gas contained in said first adsorption column having completed said adsorption step into said second adsorption column having completed said vacuum purge step, and also to evacuate said first adsorption column having completed said adsorption step.

5. The pressure swing adsorption process according to claim 4, wherein a flow rate of recovery gas flowing from the raw material supply side of said first adsorption column to the raw material supply side of the second adsorption column is gradually increased.

6. The pressure swing adsorption process according to claim 4, wherein gas recovery flowing from the product discharge side of said first adsorption column to the product discharge side of said second adsorption column is in the range of ½ to ¾ of total gas recovery, whereas gas recovery flowing from the raw material supply side of said first adsorption column to the raw material side of said second adsorption column is ¼ to ½ of the total gas recovery.

7. A pressure swing adsorption process which comprises:
    switching a plurality of adsorption columns packed with an adsorbent successively to an adsorption step, a first pressure equalization step, an evacuation step, a vacuum purge step, a second pressure equalization step and a pressurization step to allow a more strongly adsorbable component gas contained in a gaseous mixture to be adsorbed on the adsorbent and to separate a less strongly adsorbable component gas; and
    compressing the thus separated less strongly adsorbable component gas by a product gas compressor to supply it as a product gas;
    wherein procedures of reducing a feed amount of product gas is carried out by inputting a signal for reducing the feed amount of product gas to control an aperture of a flow control valve disposed on a product gas feed passage to a level corresponding to a reduced feed amount of product gas, and upon the feed amount of product gas substantially reaching a level, each step switching timing is changed in accordance with an operational mode corresponding to the reduced feed amount of product gas.

8. The pressure swing adsorption process according to claim 7, wherein a first adsorption column having completed said adsorption step and a second adsorption column having completed said vacuum purge step are allowed to communicate to each other on product discharge sides and on raw material supply sides respectively in said first pressure equalization step of the first adsorption column and said second pressure equalization step of said second adsorption column, to recover the gas contained in said first adsorption column having completed said adsorption step into said second adsorption column having completed said vacuum purge step and also to evacuate said first adsorption column having completed said adsorption step.

9. The pressure swing adsorption process according to claim 8, wherein a flow rate of recovery gas flowing from the raw material supply side of said first adsorption column to the raw material supply side of the second adsorption column is gradually increased.

10. The pressure swing adsorption process according to claim 8, wherein gas recovery flowing from the product discharge side of said first adsorption column to the product discharge side of said second adsorption column is in the range of ½ to ¾ of total gas recovery, whereas gas recovery flowing from the raw material supply side of said first adsorption column to the raw material side of said second adsorption column is ¼ to ½ of the total gas recovery.

11. A pressure swing adsorption process which comprises:

switching a plurality of adsorption columns packed with an adsorbent successively to an adsorption step, a first pressure equalization step, and evacuation step, a vacuum purge step, a second pressure equalization step and a repressurization step to allow a more strongly adsorbable component gas contained in a gaseous mixture to be adsorbed on the adsorbent and to separate a less strongly adsorbable component gas; and compressing the thus separated less strongly adsorbable component gas by a product gas compressor to supply it as a product gas;

wherein procedures of increasing a feed amount of product gas are carried out by inputting a signal for increasing the feed amount of product gas to change each step switching timing in accordance with an operational mode corresponding to an increased feed amount of product gas and then to control an aperture of a flow control valve disposed on a product gas feed passage to a level corresponding to the increased feed amount of product gas.

12. The pressure swing adsorption process according to claim 11, wherein a first adsorption column having completed said adsorption step and a second adsorption column having completed said vacuum purge step are allowed to communicate to each other on product discharge sides and on raw material supply sides respectively in said first pressure equalization step of said first adsorption column and said second pressure equalization step of said second adsorption column, to recover the gas contained in said first adsorption column having completed said adsorption step into said second adsorption column having completed said vacuum purge step and also to evacuate said first adsorption column having completed said adsorption step.

13. The pressure swing adsorption process according to claim 12, wherein a flow rate of recovery gas flowing from the raw material supply side of said first adsorption column to the raw material supply side of the second adsorption column is gradually increased.

14. The pressure swing adsorption process according to claim 12, wherein gas recovery flowing from the product discharge side of said first adsorption column to the product discharge side of said second adsorption column is in the range of ½ to ¾ of total gas recovery, whereas gas recovery flowing from the raw material supply side of said first adsorption column to the raw material side of said second adsorption column is ¼ to ½ of the total gas recovery.

* * * * *